(12) United States Patent
Sabbah et al.

(10) Patent No.: US 8,550,360 B2
(45) Date of Patent: Oct. 8, 2013

(54) PERIPHERAL SECURITY DEVICE BUILT INTO A CONTACTLESS OBJECT IN THE FORM OF SECURE DOCUMENT EQUIPPED WITH A RADIOFREQUENCY DEVICE

(75) Inventors: Elias Sabbah, Valbonne (FR); Serge Manigault, Caluire et Cuire (FR); Olivier Parrault, Golf Juan (FR)

(73) Assignee: ASK S.A., Sophia Antipolis (FR)

( * ) Notice: Subject to any disclaimer, the term of this patent is extended or adjusted under 35 U.S.C. 154(b) by 1287 days.

(21) Appl. No.: 11/837,063

(22) Filed: Aug. 10, 2007

(65) Prior Publication Data

US 2008/0128514 A1   Jun. 5, 2008

(30) Foreign Application Priority Data

Aug. 11, 2006 (FR) ..................... 06 07297

(51) Int. Cl.
*G06K 19/06*   (2006.01)
(52) U.S. Cl.
USPC ...... 235/492; 340/10.1; 340/10.4; 340/10.41; 340/572.3; 340/572.4
(58) Field of Classification Search
USPC .............. 235/380, 435, 487, 492; 380/572.8
See application file for complete search history.

(56) References Cited

U.S. PATENT DOCUMENTS

| | | | |
|---|---|---|---|
| 7,446,646 B2* | 11/2008 | Huomo | 340/10.1 |
| 7,719,425 B2* | 5/2010 | Colby | 340/572.8 |
| 2005/0186902 A1* | 8/2005 | Lieffort et al. | 455/41.1 |
| 2005/0237198 A1* | 10/2005 | Waldner et al. | 340/572.7 |
| 2005/0274794 A1* | 12/2005 | Bason et al. | 235/380 |
| 2007/0096924 A1* | 5/2007 | Horne | 340/572.8 |
| 2007/0205953 A1* | 9/2007 | Bombay et al. | 343/841 |
| 2008/0001844 A1 | 1/2008 | Sabbah et al. | 343/873 |
| 2008/0164327 A1* | 7/2008 | Eray et al. | 235/492 |
| 2008/0166962 A1* | 7/2008 | Serbanescu | 455/1 |
| 2008/0314989 A1* | 12/2008 | Eray | 235/492 |

FOREIGN PATENT DOCUMENTS

WO   WO 2005052846 A2 *  6/2005

* cited by examiner

*Primary Examiner* — Christopher Stanford
(74) *Attorney, Agent, or Firm* — James C. Lydon

(57) ABSTRACT

The invention concerns a contactless portable object (10, 30, 60) featuring a main radiofrequency device made up of a main chip (18, 38, 68) and a main antenna (16, 36, 66) connected together so that, when the portable object enters the magnetic field of a suitable reader, the main radiofrequency device provides power to the chip and ensures communication between the chip and the reader. According to the main characteristic of the invention, the portable object includes a secondary contactless device featuring a secondary antenna (12, 32, 62) and an electric circuit set up in such a way that, when the two antennas enter the magnetic field of a suitable reader at the same time, the amount of energy required to power the electric circuit and have it operational being less than the amount of energy required to power the main chip (18, 38, 68) and have it operational, the electric circuit is powered and makes the reading of data of the main chip impossible.

10 Claims, 3 Drawing Sheets

PERIPHERAL SECURITY DEVICE BUILT INTO A CONTACTLESS OBJECT IN THE FORM OF SECURE DOCUMENT EQUIPPED WITH A RADIOFREQUENCY DEVICE

TECHNICAL FIELD

The present invention concerns a peripheral device for a contactless portable object and particularly concerns a peripheral security device built into a contactless object in the form of a secure document equipped with a radiofrequency device.

BACKGROUND ART

Contactless Radiofrequency Identification Devices (RFIDs) are increasingly used for identification of persons moving about in controlled access zones or transiting from one zone to another. As a result, the market for identity document type secure documents such as passports, identity cards or others is booming. A contactless RFID is a device made up of an antenna and a chip connected to the terminals of the antenna. The chip is usually not powered by batteries and receives its energy by an electromagnetic coupling between the antenna of the reader and the antenna of the RFID, information is exchanged between the RFID and the reader and particularly information stored in the chip that relates to the identification of the holder of the object on which the RFID is located and to his/her authorization to enter into a controlled access zone.

In this manner, passports can incorporate RFIDs to identify the passport holder. The chip memory contains information such as the identity of the passport holder, his/her country of origin, his/her nationality, visas of different countries visited, dates of entry, restrictions of movements, biometric elements, etc. In order to include the RFID in the passport, there exist several solutions that consist in either directly printing the antenna on the cover board of the passport and connecting the chip to it or using an external element known as "inlay" carrying the RFID. Whatever the solution, the RFID is incorporated either in the bottom cover board of the passport or in the top cover board. In the case of an identity card, the antenna is screen printed directly on one of the layers which make up the card and the chip is connected to it.

Access to data of the chip is made by remote electromagnetic coupling with a reader also equipped with an antenna. When the antenna of the reader is powered, an electric current flows through it, which generates an electromagnetic flow. In order to be read, the identity booklet is placed on the reader at a location designed for this purpose. Once the booklet is in place, the antenna of the booklet is crossed by electromagnetic field lines emitted by the reader and the antenna thus tuned to the same frequency band as the reader receives the energy required for its power supply; it can thus communicate with the reader and exchange data. For optimal communication, the antenna of the booklet must be placed parallel to the antenna of the reader and at a distance from the reader that must be less than a minimum distance, so that the energy is sufficient to operate the chip.

The major problem that commonly arises in contactless documents in general, and in secure documents that contain personal information of biometric or civil status type in particular, is the confidentiality of information contained in the radiofrequency device incorporated in the chip of the document. Access to the data contained in the chip must be controllable, particularly when the secure document is not used, so that the confidential data is not retrieved without the knowledge of the document holder.

A solution exists as described in the document WO 2005/066890. The secure document that is described in this document includes a transponder made up of an electronic module connected to an antenna placed on a given surface of a first part of the document, the transponder being designed to communicate by means of remote electromagnetic coupling with a reader, and featuring in addition a passive element for masking the antenna, supported by a second part of the document, which can move with respect to the first part, the masking element being capable of minimizing the coupling between the transponder and the reader to make the reading of the document difficult in a predetermined position of the second part which corresponds to a closed position of the document.

The drawback of such a device resides in the fact that the action on the coupling between the transponder and the reader does not act as an on/off switch but acts so as to attenuate the signal in order to minimize the coupling between the transponder and the reader. Furthermore, since the attenuation of the signal depends on the signal frequency, the greater the attenuation, the higher the signal frequency; the operating frequency of secure documents is 13.56 MHz as defined in the ISO 14443 and 15693 standards. The attenuation of the signal also depends on the characteristics of the masking element such as its thickness and its electrical conductivity, and it also depends on the distance between the passive element and the antenna of the radiofrequency identification device. The closer the masking element is to the antenna, the more efficient it is.

The attenuation level of the signal will thus depend on the manner in which the secure document is held closed. Therefore, a passport placed in a bag and slightly open may be read without the knowledge of its holder. Similarly, a passport whose pages are thick because of wear or the presence of visas will reduce the effectiveness of the passive masking element. The attenuation level of the signal also depends on the thickness of the passport.

In addition, the minimum reading distance between the passport and the reader varies according to the level of the electromagnetic field emitted by the antenna of the reader. The effectiveness of the communication between the reader and the passport thus varies according to the field emitted by the reader. This means that, even when it is equipped with passive masking, the passport can be read with a suitable reader as the passive masking actually reduces the reading distance. This solution therefore does not guarantee the passport holder against untimely reading.

SUMMARY OF THE INVENTION

This is why the object of the invention is to provide a device that prevents the untimely reading of data contained in a contactless object in the form of a secure document equipped with a radiofrequency device while mitigating the aforementioned drawbacks.

The purpose of the invention is thus a contactless portable object featuring a main radiofrequency device made up of a main chip and a main antenna connected together so that, when the portable object enters the magnetic field of a suitable reader, the main radiofrequency device provides power to the chip and ensures communication between the chip and the reader. According to the main characteristic of the invention, the portable object includes a secondary contactless device featuring a secondary antenna and an electric circuit set up in such a way that, when the two antennas enter the magnetic field of a suitable reader at the same time, the amount of energy required to power the electric circuit and have it operational being less than the amount of energy required to power the main chip in order to operate the latter, the electric circuit is powered and makes reading of data of the main chip impossible.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
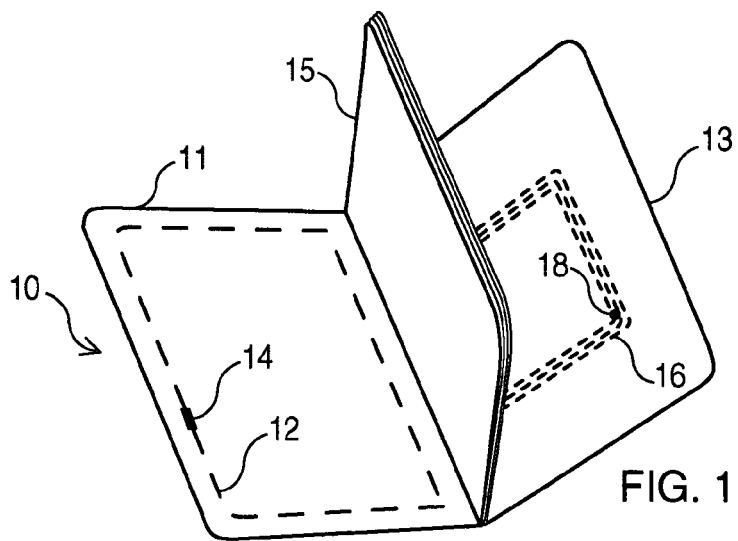
FIG. 1 represents a passport according to a first embodiment of the invention.

According to FIG. 1, the booklet type contactless portable object 10 such as a passport includes a front cover page 11 and a back cover page 13 and a quire of inside pages 15 inserted between the two covers. The radiofrequency device is preferably placed on the back cover but could also be on the front cover of the passport or else on one of the pages of the inside quire. The radiofrequency device features an electronic chip 18 and an antenna 16 connected together. The radiofrequency device represented with dotted lines on the figure is not visible as it is built into the passport in the cover, usually between a cover board of one of the cover pages of the passport and the flyleaf located opposite. The radiofrequency device consisting of the chip 18 and the antenna 16 will be referred to in the description that follows as the main radiofrequency device. It is designed to receive energy and communicate by means of remote electromagnetic coupling with an appropriate reader. The antenna 16 is crossed by an induced current when it enters the magnetic field produced by the antenna of a reader and thus enables the power supply of the chip by applying a voltage at its terminals. The communication between the radiofrequency device and the reader allows the exchange of data and particularly of the information stored in the chip 18 that relates to the identification of the holder of the booklet. As a result, the electronic chip 18 features several complex functions designed to process information from the reader. In this manner, to be able to interpret, store and compare information and communicate with the reader, the chip contains a micro-controller, a memory, an input/output unit, etc. The size of the antenna 16 usually corresponds to that used for contactless credit card size cards and depends on the type of chip used.

The passport 10 also features a second antenna 12 connected to an electric circuit, for example contained in a second electronic chip 14, the antenna being placed on the second cover of the booklet, the one that does not include the main radiofrequency device. The second antenna 12 and the second chip 14 form, in the entire description that follows, the secondary radiofrequency device. In FIG. 1, the secondary radiofrequency device is located on the front cover of the passport but it could also be placed on one of the pages of the inside quire. While the main antenna 16 is supported by a first part of the passport, the second antenna must be supported by a second part of the passport, which can move with respect to the first part. Like for the main chip and antenna 16 and 18, the chip 14 and the antenna 12 are connected together and allow signals to be received and transmitted in the carrier frequency delivered by the reader, i.e. at a frequency of 13.56 MHz corresponding to the 14443 standard. The chip 14 does not contain specific data but it contains a function capable of generating unusable data randomly so that the pieces of information transmitted by the main device get mixed and become unreadable.

The reader used for reading the passport has a flat face for reading designed to receive the document to be read by remote electromagnetic coupling. The reader enables the reception and transmission of radiofrequency signals with the contactless device, thus with the identity booklet when the latter is placed on the reader so that the main antenna 16 of the passport is crossed by magnetic field lines emitted by the reader; the main chip is then powered and the exchange of data between the main radiofrequency device and the reader is possible. However, in order not to prevent the reading of data of the main chip 18, the secondary chip 14 must not receive energy so as not to transmit data. To this end, the antenna 12 must not enter the magnetic field emitted by the reader so as not to be crossed by a current; this is achieved by various means according to the reader models.

Figure 2:
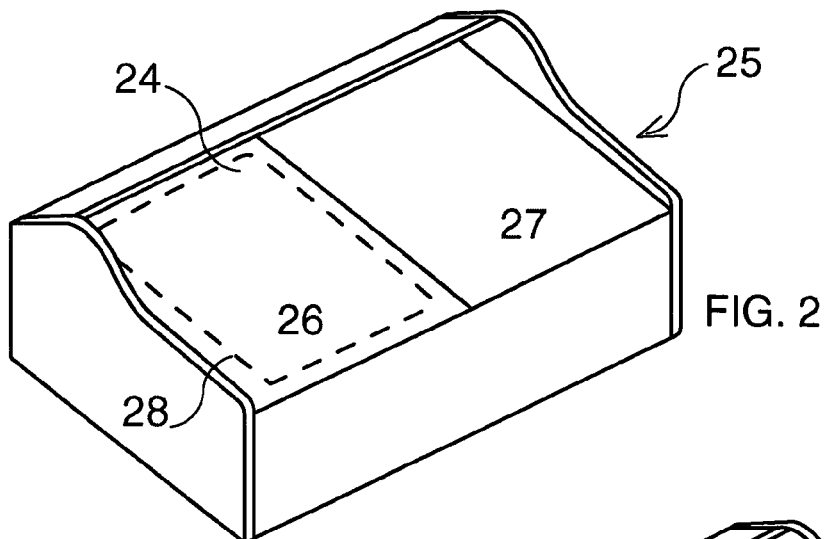
FIG. 2 represents a first reader of a radiofrequency device such as a passport.
Figure 3:
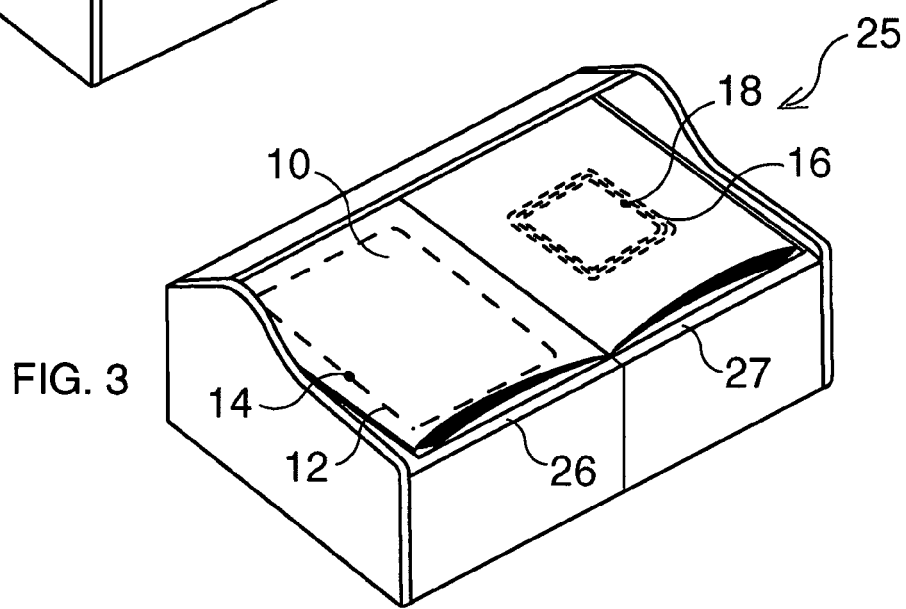
FIG. 3 represents the passport and the first reader during deliberate reading.

The reader model shown in FIGS. 2 and 3 is specially adapted to reading personal booklets such as a passport because its top reading face is slightly larger than the size of an open passport. In this case, the antenna of the reader must be of the size of the closed passport. The reading face 24 may be considered as being made up of an active part 26 and a passive part 27. The active part 26 being used to house the antenna 28 of the reader whereas the part 27, known as passive, does not house any element making up the antenna. When the passport is placed on the reader in order to be read, the part of the passport containing the main radiofrequency device is pressed against the active part 26 whereas the part of the passport containing the secondary radiofrequency device is pressed against the passive part 27. In this way, only the antenna 16 of the main radiofrequency device receives energy. In order to ensure that no magnetic field lines emitted by the antenna of the reader cross the antenna 12 of the secondary radiofrequency device, it is preferable to place a metal shielding plate under the passive part of the reading face 24 of the reader.

With reference to FIGS. 1 and 2, when the passport 10 completely enters the field of the reader 25, the two antennas 16 and 12 tuned to the same frequency as the carrier frequency of the reader receive the energy required for powering them. The energy supplied must be greater than or equal to the energy that is required for the proper operation of applications run by the chips 18 and 14. The chip 14 is not designed to communicate with the reader; as a result, it does not contain any intelligence such as a microcontroller to store and compare information so that these functions are much less complex than that of the chip 18. Since each function of the chip requires energy, its triggering threshold to enter into active phase is much lower than that of the chip 18; in other words, the amount of energy required to power the chip 14 and have it operational is much lower than the amount of energy required to power the chip 18 and have it operational. As a result, since the chip 14 consumes less energy than the chip 18, it is powered first. To further guarantee this remote supply sequence of chips, the antenna 12 is the largest possible. Thus, as soon as the antenna 12 enters the field, it first retrieves the energy required for powering the chip 14 which instantly goes into random data transmission mode. The chip 14 is powered first, before chip 18. The useful signals exchanged between the antenna 16 and the reader collide with the random data transmitted by the chip 14 so that they are superimposed and mixed together. The useful data is thus scrambled by the random data and cannot be read.

In the closed position of the passport, the electromagnetic field lines emitted by the reader cross antenna 12 and antenna 18 at the same time. Thus, the passport holder can be assured that the personal data contained in his/her passport will not be read without his/her knowledge when the passport is in the closed position. If the holder has inopportunely left his/her passport in the open position or even slightly open in his/her bag or his/her pocket, the result will not be the same if the passport is located close to the reader or away from it. In a distant field, i.e. when the passport is located a long way from the reader, the two antennas 16 and 12 are necessarily crossed by electromagnetic field lines emitted by the reader and, like for the case where the passport is closed, the data transmitted by chip 14 as well as by chip 18 will be superimposed, making the reading of useful data impossible. On the other hand, when the passport holder intentionally presents his/her passport, the latter in order to be read will have to be positioned on a suitable reader which will enable reading only when the passport is in the open position. Therefore, the useful data are read when the chip 18 is powered by the antenna 16 and the chip 14 is not powered. Thus, the antenna 12 must not enter the field emitted by the reader, which requires some handling of the passport with respect to the reader. The passport is presented flat on the active part of the face of a reader so that only half the passport featuring the main antenna and the chip are opposite the antenna of the reader. In this manner, in order to be read, the passport 10 is presented open on the reader, so that the rear face of the passport is against the reader as mentioned in FIG. 2. In order that the useful data are not read, the opening angle of the passport comprising the two devices is quite important and varies between 0 and 90°.

Figure 4:
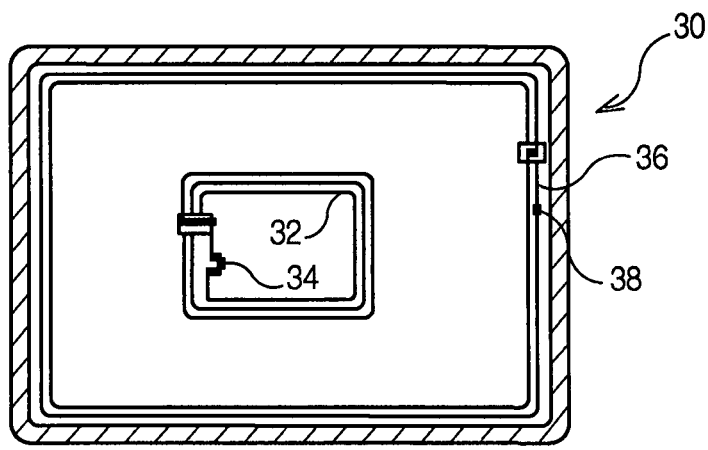
FIG. 4 represents an identity card according to a variant of the first embodiment of the invention.

In the case where the secure document is a contactless portable object in the form of an identity card 30 as shown in FIG. 4, the main and secondary radiofrequency devices are inevitably supported on the same flat surface of the document, considering that the document does not feature two parts which can move with respect to one another. The flat winding of the antenna of the secondary device is then in the same plane as the main antenna. The secondary device made up of the secondary antenna 32 and an electric circuit contained, for example, in a secondary chip 34, is located at the centre of the card whereas the main radiofrequency device made up of the main antenna 36 and the chip 38 is placed so as to enclose the secondary device.

Figure 5:
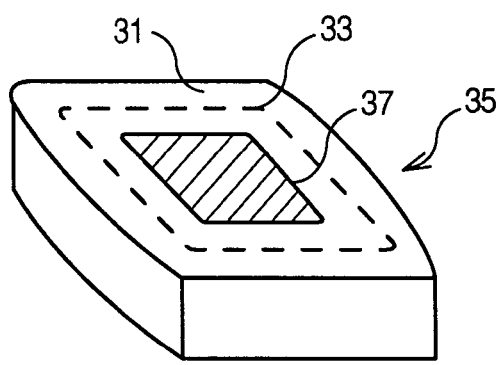
FIG. 5 represents a second reader of a radiofrequency device such as an identity card.

The reader 35 represented in FIG. 5 features a reading face 31 which houses an antenna 33 designed to communicate with a contactless device such as the identity card 30. When the identity card 30 enters the field of an appropriate reader 35 as represented in FIG. 5, the two antennas 32 and 36 tuned to the same frequency band as the reader receive the energy required to power them. The energy supplied must be greater than or equal to the energy required for the proper operation of applications run by the chips 34 and 38. The functions of the chip 34 are much less complex than the functions of the chip 38 so that its triggering threshold to enter into active phase is much lower than that of the chip 38; in other words, the amount of energy required to power the chip 34 and have it operational is lower than the amount of energy required to power the chip 38 and have it operational. As a result, since the chip 34 consumes less energy than the chip 38, it is powered first. To further guarantee this remote supply sequence of chips, the antenna 32 is sized and set up so that it first retrieves the energy required for powering the chip 34 which instantly goes into random data transmission mode. The chip 34 is powered first, before chip 38. The useful signals exchanged between the antenna 36 and the reader collide with the random data transmitted by the chip 34 so that they are superimposed and mixed together. The useful data is thus scrambled by the random data and cannot be read untimely.

The reader 35 is provided with means so that the secondary antenna 32 of the secondary radiofrequency device is not crossed by electromagnetic field lines emitted by the reader when the contactless device is placed against the reading face 31 of the reader. A means used so that the secondary antenna 32 of the secondary radiofrequency device is not crossed by electromagnetic field lines emitted by the reader is represented in FIG. 5 by a shield 37 placed under the reading face of the reader so that, when the identity card is placed on or above the reading face, the dimension of the shield is such that it superimposes on the secondary antenna so as to completely cover the surface area defined by the antenna. The shield is made up of a metal plate such as a copper, silver alloy or aluminum plate in order to disturb the field lines and prevent powering of the secondary antenna. In this manner, the reading face 31 of the reader 35 features an active part housing the antenna 36 of the reader 35 and a passive part corresponding to the location housing the shield.

Figure 6:
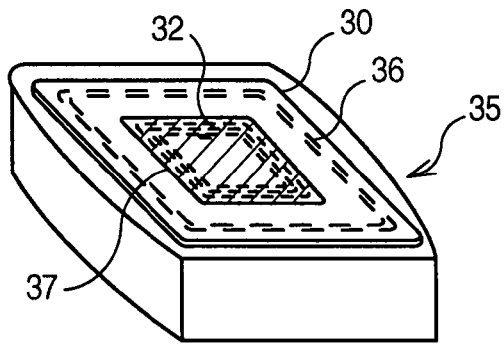
FIG. 6 represents the identity card and the second reader during deliberate reading.

In this way, the reader 35 ensures the reception and transmission of radiofrequency signals with the contactless device thus with the main radiofrequency device of the identity card when the latter is placed against the reading face 31, as shown in FIG. 6, without being disturbed by the transmission of random data by the secondary radiofrequency device of the identity card. When the identity card 30 is placed against the reading face of the reader 35, the field lines emitted by the reader do not cross the antenna 32 of the secondary device because of the shield 37; as a result, the secondary device is not powered and thus does not transmit random data that would prevent the reading of data from the main chip.

In the case of a contactless device such as a passport described in FIG. 1, it is possible to use a reader model of the type diagrammatically shown in FIG. 5, the size of the reader antenna then corresponding to the size of the closed passport. In order to be read, the passport must be presented so that the antenna of the passport is against the reading face of the reader. The passport is preferably presented on the reader on the side of the cover bearing the secondary device. In order to be read in the closed position, the antenna 12 of the passport's secondary radiofrequency device will be smaller than the antenna 16 of the main radiofrequency device so that only the main antenna is crossed by field lines emitted by the reader, the secondary antenna 12 then being masked by the shield 37 of the reader.

Figure 8:
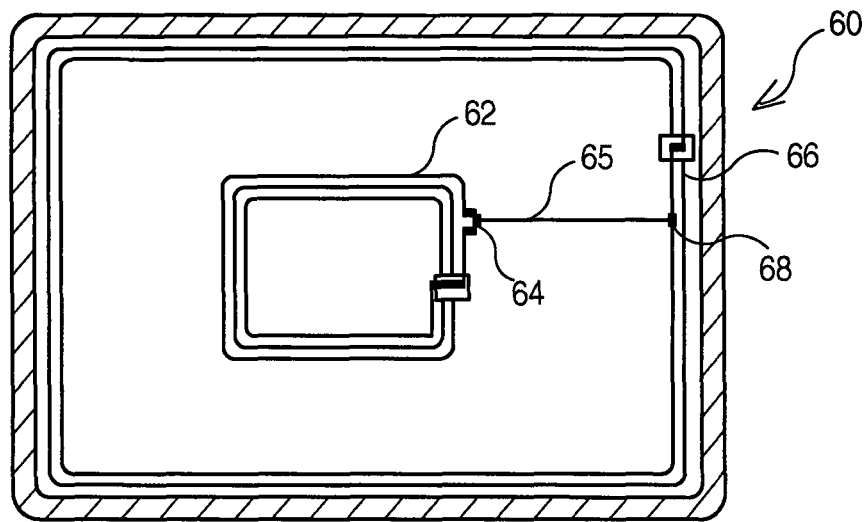
FIG. 8 represents an identity card according to the second embodiment of the invention.

According to a second embodiment of the invention and with reference to the diagrammatic FIG. 8, both main and secondary radiofrequency devices are connected together. The main radiofrequency device features a chip 68 and an antenna 66 connected together, the chip 68 being, like for the first embodiment, the main chip containing personal identification data of the holder of the portable object. As a result, the electronic chip 68 run several complex functions designed to process information from the reader. In this manner, to be able to interpret, store and compare information and communicate with the reader, the chip contains a micro-controller, a memory, an input/output unit, etc. The secondary radiofrequency device consists of an electric circuit, for example contained in a chip 64, and an antenna 62.

The electric circuit of the chip 64 is a simple circuit such as a field detection circuit and thus contains neither a micro-controller, nor any memory; as a result, the chip 64 is much less complex than the chip 68 so that its triggering threshold to enter into active phase is much lower than that of the chip 68; in other words, the amount of energy required to power the chip 64 and have it operational is lower than the amount of energy required to power the chip 68 and have it operational. As a result, since the chip 64 consumes less energy than the chip 68, it is powered first.

The electric circuit such as the field detection circuit can be integrated directly into the main chip. In this case, it is a chip with two input stages, one for each of the two devices. The field detection circuit enables, for example, to generate a reference voltage level Vu (5V for example) in the presence of the reader field in order to provide a logical signal for deactivating the main function of the chip 68 in order to make it silent. The logical deactivation signal is processed by the chip 68 as soon as it is powered so that any communication with the reader is prevented if the deactivation signal is present. The logical deactivation signal provided by the electric circuit 67 is transmitted before the main chip 68 can respond, because the amount of energy required to power the electric circuit 67 and have it operational is less than the amount of energy required to power the chip 68 and have it operational. As a result, since the electric circuit 67 consumes less energy than the chip 68, it is powered first. Certain hybrid smart cards, i.e. able to function with or without contact, use an equivalent selection principle on starting to make a choice between applying the contact function or the contactless function. The device according to the invention includes this principle to select, on starting, whether the application contained in the main chip is to be continued or suspended or if communications are to be prevented.

The main chip 68 includes in its operating system a function triggered from the initialization of the chip in order to test the logical field detection signal provided by the secondary chip 64. According to the test result, the application contained in the operating system of the main chip 68 continues its execution or stops. The chip actually has two input systems of which one has priority over the other. The two radiofrequency devices are connected together, for example, by an electrical connection 65 between the field detection circuit of the chip 64 and the chip 68 or between the antenna 62 and the main chip 68 in the case where the field detection circuit is directly built into the chip 68.

Like for the first embodiment of the invention, the second embodiment can be applied to all types of contactless portable objects such as a secure document equipped with a radiofrequency device. According to FIG. 8, the secure document is an identity card but could also be a passport type booklet as shown in FIG. 1. In this case, there are two possible locations for the secondary antenna 62: either it is situated on the same page or the same cover as the main radiofrequency device or it is situated on a passport page that is movable with respect to the part including the main device or on the second cover. The second possibility requires that the electrical connection 65 passes on the binding of the passport.

Figure 9:
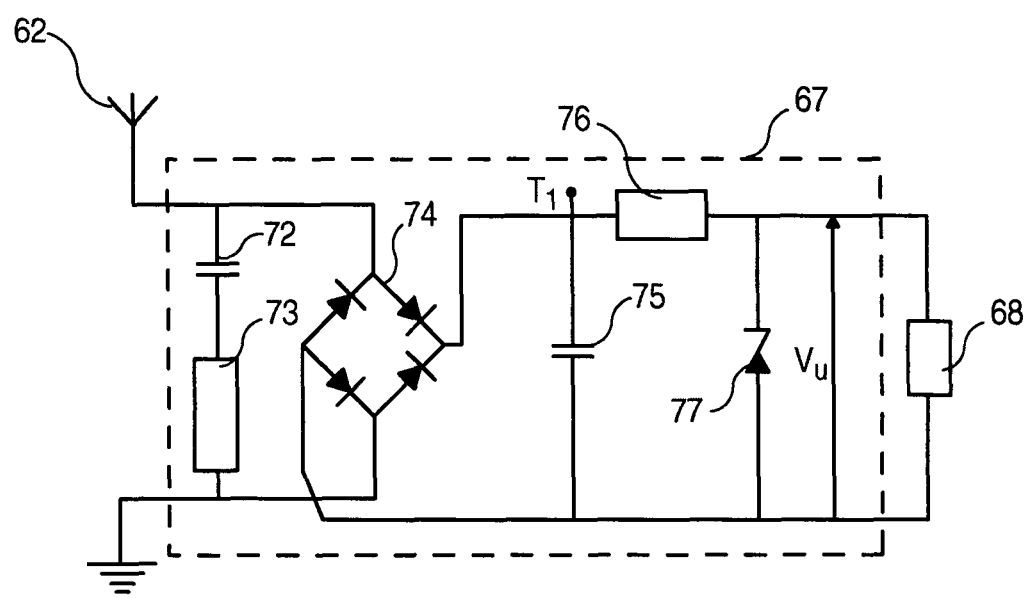
FIG. 9 represents a circuit diagram of an illustrative embodiment of a field detection circuit connected to a secondary antenna.

FIG. 9 represents the circuit diagram of an exemplifying embodiment of the field detection electric circuit connected to the secondary antenna 62. The frame 67 represents the field detection circuit which is either in the chip 64 or directly built into the main chip 68. The antenna 62, the capacitor 72 and the resistance 73 form an oscillating circuit tuned to the frequency of the reader, i.e. 13.56 MHz. The role of the diode bridge rectifier 74 and the capacitor 75 is to rectify and smoothen the alternating signal available at the terminals of the oscillating circuit. At point T1, the voltage is continuous and depends on the electromagnetic field to which the antenna is exposed. The Zener diode 77 helps regulate the reference output voltage Vu and is itself protected against over-current by a resistance 76. The voltage at the output of the field detection circuit is applied, or not applied, to the input of the chip 68 by means of the electrical connection 65, and constitutes the logical signal mentioned previously. When it enters a carrier frequency field, the antenna 62 powers the chip 64 and thus the circuit 67, and the output voltage changes to the reference value Vu. Since the antenna 62 is not located in the field of the carrier frequency, no current crosses it and the circuit 64 delivers a zero voltage.

If the detection circuit of the chip is directly built into the main chip 68, the two antennas are directly connected to the main chip 68. When the contactless portable object 60 featuring the two devices enters the field of the reader 35 as shown in FIG. 5, the two antennas 66 and 62 tuned to the same frequency band as the reader receive the energy that is required for powering them. The energy supplied must be greater than or equal to the energy that is required for the proper operation of applications run by the chips 68 and 64. Since the chip 64 consumes less energy than the chip 68 because of its lower triggering threshold, it provides the logical signal before the chip 68 is initialized. To further guarantee this remote supply sequence of chips, the antenna 62 is sized and set up so that it first retrieves the energy required for powering the chip. Thus, as soon as the antenna 62 enters the field, it first retrieves the energy required to power the chip 64 and thus to power the field detection circuit 67 which delivers a voltage representing the logical field detection signal to the main chip 68. The main chip 68 then instantly goes into a mode where no signal is exchanged with the reader, thereby rendering the main chip 68 silent and thus making the reading of data impossible.

Figure 7:
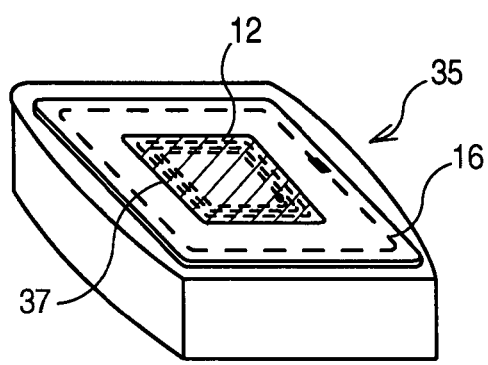
FIG. 7 represents the passport and the second reader during deliberate reading.

When data needs to be read from the main chip 68 of the contactless portable object, the field detection circuit must not be powered; as a result, the antenna 62 must not be crossed by electromagnetic field lines emitted by the antenna of the reader. To this end, the contactless portable object must be placed on a reader so that the secondary antenna 62 is masked. In the case of a booklet such as a passport, if the two antennas are each placed on a part of the passport which can move with respect to the other, the passport must be placed open in the same way as in the first embodiment on a reader 25 of the same type as described in FIGS. 2 and 3. It can also be read on a reader 35 in the same way as in the example of FIG. 7 described previously. In the case of an identity card, the two antennas are placed on the same flat part and the data is read as in the example of FIGS. 4 to 6 described previously.

According to an alternate embodiment of the device according the preferred embodiment of the invention, the secondary radiofrequency device can include an antenna with two sets of turns, each set comprising at least one turn. The first set comprises one or more turns as large as the turn 12 defined for the secondary radiofrequency device of FIG. 1. The set comprises one or more turns with a size smaller than that of turns of the first set. The size of turns of the second assembly is preferably greater than that of the antenna of the main radiofrequency device. The antenna of the secondary radiofrequency device thus features at least two sets of turns with different sizes.

The invention claimed is:

1. A contactless portable object comprising
a main radiofrequency device made up of a main chip and a main antenna connected together so that when the portable object enters an electromagnetic field of a suitable reader, the main radiofrequency device provides power to the chip and ensures communication between the chip and the reader,
wherein said contactless portable object further comprising a secondary contactless device comprising a secondary antenna and an electric circuit, with the main radiofrequency device and the secondary radiofrequency device both supported on a flat surface of the portable object, with the main radiofrequency device placed so as to encircle the secondary device, and with the electric circuit of the secondary contactless device set up in such a way that, when the two antennas enter said electromagnetic field of a suitable reader at the same time, and an amount of energy required to power said electric circuit and have it operational is less than an amount of energy required to power the main chip and have it operational, said electric circuit is powered and makes reading of data of the main chip impossible,
wherein said electric circuit is configured to transmit random data as soon as it receives the amount of energy required for its operation, so that the transmission of random data occurs before the main chip can exchange data with the reader.

2. The contactless portable object of claim 1, wherein the electric circuit is contained in a secondary chip.

3. The contactless portable object of claim 1, wherein the secondary antenna is connected to the main radiofrequency device.

4. The contactless portable object of claim 1, wherein said electric circuit is a field detection circuit.

5. The contactless portable object of claim 4, wherein the field detection circuit allows a voltage of 5V to be generated in the presence of the field of the reader in order to provide a logical signal for deactivating the main function of the chip to make it silent.

6. The contactless portable object of claim 1, wherein the secondary antenna comprises at least two sets of turns, said sets of turns having different sizes.

7. A booklet which incorporates the contactless portable object of claim 1.

8. An identity card which incorporates the contactless portable object of claim 1.

9. A system comprising the contactless portable object of claim 1 and a radiofrequency reader comprising a reading face consisting of an active part housing an antenna and a passive part housing an antenna masking element, the reader being adapted to read data contained in said contactless portable object when a part of the contactless portable object containing the main radiofrequency device is placed against the active part of the reader whereas the secondary contactless device is placed against the passive part.

10. The system of claim 9, wherein said passive part houses a metal plate whose dimension is such that it superimposes on the secondary antenna so as to completely cover the surface area defined by the secondary antenna.

* * * * *